2,928,879
Patented Mar. 15, 1960

2,928,879

OXIDATION OF HYDROCARBONS WITH SULFUR DIOXIDES

Thomas H. Strickland and Alan Bell, Kingsport, Tenn., assignors to Eastman Kodak Company, Rochester, N.Y., a corporation of New Jersey No Drawing. Application November 22, 1957
Serial No. 698,043

4 Claims. (Cl. 260—599)

This invention relates to a novel process for the oxidation of alkylated benzene hydrocarbons. In a specific aspect this invention relates to a process for the oxidation of monoalkylated and dialkylated benzene hydrocarbons in the vapor phase with sulfur dioxide to form aromatic aldehydes. In a more specific aspect, this invention relates to the oxidation of toluene with sulfur dioxide in the vapor phase to form benzaldehyde.

This application is a continuation-in-part of our co-pending application Serial No. 590,809, filed June 12, 1956, now Patent No. 2,821,552.

In the prior art, alkylated aromatic hydrocarbons have been oxidized with a variety of oxidizing media, for example, steam, oxygen, which may be in the form of air, and the like. In some instances, sulfur dioxide has been employed along with the oxygen or other oxidizing medium in order to control the reaction. However, the prior art procedures have not recognized the fact that sulfur dioxide itself can be used as the oxidizing medium for alkylated aromatic hydrocarbons.

In accordance with this invention, it has been found that sulfur dioxide can be used as the sole source of oxygen for the oxidation of alkylated benzene hydrocarbons to form a product containing a substantial amount of an aromatic aldehyde and substantially no aromatic acids.

The alkylated benzene hydrocarbons that are oxidized in accordance with this invention are benzene derivatives containing one or two methyl groups or substituents, i.e. toluene and the xylenes. When the benzene nucleus contains a single methyl radical the resulting oxidation product is either predominantly or solely benzaldehyde. When the benzene nucleus contains more than a single methyl substituent, such as a xylene, the resulting product is usually a mixture of aromatic aldehydes.

In practicing this invention, sulfur dioxide is the sole source of oxygen for the oxidation reaction. If desired, inert gases, such as nitrogen, carbon dioxide and the like, can be employed to control the reaction; however, these inert gases are not essential to the carrying out of the reaction.

The process of this invention is usually carried out by passing a mixture of sulfur dioxide vapor and hydrocarbon vapor at atmospheric pressure over a heated catalyst for the reaction. Among the catalysts that can be used for the reaction are oxides of heavy metals in group VA, VIA and VIII of the periodic table. For example, oxides of metals, such as vanadium, molybdenum, tungsten, chromium, iron and nickel can be used as catalysts for the reaction. The oxides of vanadium and tungsten are the preferable catalysts for this reaction. If desired, these catalysts can be supported on a suitable supporting material such as alumina, silica and the like.

As indicated above, the reaction is ordinarily carried out at atmospheric pressure and an elevated temperature. In order to produce a product free of aromatic acids a temperature substantially below 350° C. is employed, and usually the temperature is within the range of 275° to 330° C. Contact times between reactants and catalyst are within the range of 3–7 seconds. At shorter contact times the higher temperatures are used, and lower temperatures are preferred for the longer contact times. Superatmospheric pressures are undesirable since the reactants are in the gaseous phase. Subatmospheric pressures can be used, but atmospheric pressure is preferred for the process.

The oxidation reaction takes place between the sulfur dioxide and hydrocarbon to form the aldehyde in the absence of any other oxidizing means in the following manner;

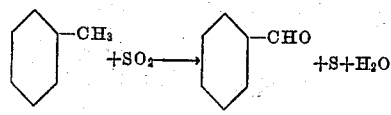

It is, of course, to be realized that in this equation, toluene is merely representative of the hydrocarbons that can be oxidized in accordance with this process. It is evident from this equation that the hydrocarbon and sulfur dioxide can be employed in the reaction in equimolar ratios. If desired, an excess of hydrocarbon can be employed to carry out the reaction. When an excess of hydrocarbon is used, the excess gas forms a diluent for the reaction in the same manner in which nitrogen or other inert gas can be used to control the reaction.

In oxidation procedures, wherein a hydrocarbon is oxidized in the vapor phase with air or oxygen, the resulting oxidation products are mixed oxygen-containing compounds. However, when the same hydrocarbon is oxidized in the vapor phase with gaseous sulfur dioxide, under the conditions herein set forth, the resulting oxidation product is usually only one oxygen-containing compound. For example, if toluene is oxidized with air over vanadium oxide as a catalyst, the product of the reaction is a mixture of benzaldehyde, benzoic acid and maleic acid. However, when toluene is oxidized with gaseous sulfur dioxide under the conditions herein set forth, using a vanadium oxide catalyst, the product is primarily benzaldehyde. In the process of this reaction, the presence of benzoic acid has not been detected in the reaction product.

The following examples are illustrative of this invention:

Example 1

A gaseous mixture containing 74.4% toluene, 22.8% sulfur dioxide and 2.8% nitrogen at atmospheric pressure was passed into contact with a catalyst mass of vanadium oxide on alumina at 310° C. The superficial velocity was 54.5 feet per hour, and the apparent contact time was 6.9 seconds. The reaction proceeded smoothly with the production of benzaldehyde, sulfur, unreacted toluene and water. Unreacted toluene was separated from the reaction product and recirculated through the apparatus with additional sulfur dioxide. The yield of benzaldehyde based on the toluene consumed was 80%. Benzoic acid was not detected in the reaction products.

Example 2

A catalyst mass of vanadium oxide on alumina was maintained at 315° C. and contacted with a gaseous mixture containing 73.5% toluene, 23.8% sulfur dioxide and 2.7% nitrogen at atmospheric pressure. The superficial velocity was 50 feet per hour and the apparent contact time was 6.5 seconds. The reaction proceeded smoothly with the production of benzaldehyde, sulfur, unreacted toluene and water, and unreacted toluene was recycled. The yield of benzaldehyde based on the sulfur dioxide consumed was 90%. Benzoic acid was not detected in the reaction products.

In order to demonstrate the results obtained when higher reaction temperatures are employed, the following example is included.

*Example 3*

A gaseous mixture of toluene, sulfur dioxide and nitrogen was contacted at atmospheric pressure with a catalyst mass of vanadium oxide on alumina at 370° C. The superficial velocity was 432 feet per hour and the apparent contact time was 0.75 second. The reaction proceeded smoothly with the production of benzaldehyde, benzoic acid, sulfur and water, and unreacted toluene was recirculated with additional sulfur dioxide. The yield of benzaldehyde based on toluene consumed was 3.95%.

In the above examples, space velocity designates the volume of gas (at reaction temperature and at atmospheric pressure) circulated per hour per unit volume of catalyst. The apparent contact time is the reciprocal of the hourly space velocity converted to a base of seconds, and the superficial velocity designates the volume of gas (at reaction temperature and at atmospheric pressure) circulated per hour per unit of cross sectional area of the catalyst bed.

*Example 4*

In accordance with the procedure described in Example 1, o-xylene, m-xylene and p-xylene are oxidized with sulfur dioxide to form the corresponding mono- and dialdehydes.

In our copending application aromatic hydrocarbons were oxidized with sulfur dioxide at elevated temperatures of 350° C. and higher, and at these conditions the oxidation reaction product was found to contain a substantial amount of aromatic acids. Under the conditions employed in the present process it is possible to produce an oxidation reaction product containing substantially no aromatic acids.

We claim:

1. The process for oxidizing a hydrocarbon selected from the group consisting of toluene and the xylenes which comprises contacting said hydrocarbon and sulfur dioxide, as the sole source of oxygen for the reaction, said reactants being in the gaseous phase, with a heavy metal oxide catalyst selected from the group consisting of the oxides of heavy metals in groups VA, VIA and VIII of the periodic table at a temperature of 275–330° C. and at a contact time of 3 to 7 seconds to form a product containing an aromatic aldehyde and substantially free of aromatic acids.

2. The process for oxidizing a xylene which comprises contacting said xylene and sulfur dioxide, as the sole source of oxygen for the reaction, said reactants being in the gaseous phase, with a heavy metal oxide catalyst selected from the group consisting of the oxides of heavy metals in groups VA, VIA and VIII of the periodic table at a temperature of 275–330° C. and at a contact time of 3 to 7 seconds to form a product containing benzaldehyde and substantially free of benzoic acid.

3. The process for oxidizing toluene which comprises contacting said toluene and sulfur dioxide, as the sole source of oxygen for the reaction, said reactants being in the gaseous phase, with a heavy metal oxide catalyst selected from the group consisting of the oxides of heavy metals in groups VA, VIA and VIII of the periodic table at a temperature of 275–330° C. and a contact time of 3–7 seconds to form a product containing benzaldehyde and substantially free of benzoic acid.

4. The process for oxidizing toluene which comprises contacting acid toluene and sulfur dioxide, as the sole source of oxygen for the reaction, said reactants being in the gaseous phase, with a vanadium oxide catalyst at a temperature of 275–330° C. and a contact time of 3–7 seconds to form a product containing benzaldehyde and substantially free of benzoic acid.

References Cited in the file of this patent

UNITED STATES PATENTS

| | | |
|---|---|---|
| 1,636,854 | Craver | July 26, 1927 |
| 1,636,855 | Craver | July 26, 1927 |
| 2,199,585 | Bone et al. | May 7, 1940 |
| 2,821,552 | Strickland et al. | Jan. 28, 1958 |

FOREIGN PATENTS

| | | |
|---|---|---|
| 408,184 | Germany | Sept. 28, 1920 |

OTHER REFERENCES

Karrer: Organic Chemistry, 4th ed. (1950), p. 504.